United States Patent
Benveniste

(10) Patent No.: US 7,548,531 B2
(45) Date of Patent: *Jun. 16, 2009

(54) POLL SCHEDULING FOR PERIODIC TRAFFIC SOURCES

(75) Inventor: Mathilde Benveniste, South Orange, NJ (US)

(73) Assignee: Avaya Inc., Basking Ridge, NJ (US)

(*) Notice: Subject to any disclaimer, the term of this patent is extended or adjusted under 35 U.S.C. 154(b) by 1081 days.

This patent is subject to a terminal disclaimer.

(21) Appl. No.: 10/673,702

(22) Filed: Sep. 29, 2003

(65) Prior Publication Data
US 2004/0133913 A1     Jul. 8, 2004

Related U.S. Application Data

(60) Provisional application No. 60/433,604, filed on Dec. 16, 2002.

(51) Int. Cl.
*H04W 4/00* (2009.01)

(52) U.S. Cl. ............... 370/338; 370/310.2; 370/437; 370/441; 370/442; 370/443; 370/445; 370/447; 370/448; 455/450; 455/452.1; 455/452.2; 455/453; 725/9; 725/14; 725/16

(58) Field of Classification Search ............... 725/9, 725/14, 16; 370/328, 468; 455/450, 452.1, 455/452.2, 453
See application file for complete search history.

(56) References Cited

U.S. PATENT DOCUMENTS

| | | | | |
|---|---|---|---|---|
| 5,737,330 A | * | 4/1998 | Fulthorp et al. | 370/346 |
| 2002/0093953 A1 | * | 7/2002 | Naim et al. | 370/386 |
| 2003/0198244 A1 | * | 10/2003 | Ho et al. | 370/442 |

* cited by examiner

*Primary Examiner*—Stephen M D'Agosta
(74) *Attorney, Agent, or Firm*—Chapin IP Law, LLC; David W. Rouille, Esq.

(57) ABSTRACT

An apparatus and method for polling stations that transmit periodic traffic streams are disclosed. The illustrative embodiment polls the station in accordance with a polling schedule that is generated to reduce the delay between (i) when the station queues a frame, and (ii) when the station transmits the frame. This reduces the waiting time of the frame in the station, and is, therefore, especially advantageous for latency-sensitive applications such as voice and video telecommunications. In accordance with the illustrative embodiment, a station that expects to periodically queue a frame for transmission sends a polling request to the polling coordinator, which request enables the polling coordinator to generate an advantageous polling schedule.

12 Claims, 9 Drawing Sheets

POLL SCHEDULING FOR PERIODIC TRAFFIC SOURCES

REFERENCE TO RELATED APPLICATIONS

This application claims the benefit of U.S. provisional patent application Ser. No. 60/433,604, filed 16 Dec. 2002, entitled "Poll Scheduling and Power Saving," which is also incorporated by reference.

The following patent application is incorporated by reference: U.S. patent application Ser. No. 10/674,178, filed on 29 Sep. 2003, entitled "Exploratory Polling for Periodic Traffic Sources", now issued as U.S. Pat. No. 7,154,876.

FIELD OF THE INVENTION

The present invention relates to telecommunications in general, and, more particularly, to local area networks.

BACKGROUND OF THE INVENTION

FIG. 1 depicts a schematic diagram of wireless local-area network 100 in the prior art, which comprises: access point 101, stations 102-1 through 102-N, wherein N is a positive integer, and hosts 103-1 through 103-N, interconnected as shown. Each station 102-$i$, wherein i is a positive integer in the set $\{1, \ldots N\}$, enables host 103-$i$ (a device such as a notebook computer, personal digital assistant [PDA], tablet PC, etc.) to communicate wirelessly with other hosts in local-area network 100 via access point 101.

Access point 101 and stations 102-1 through 102-N transmit blocks of data called frames. A frame typically comprises a data portion, referred to as a data payload, and a control portion, referred to as a header. Frames transmitted from a station 102-$i$ to access point 101 are referred to as uplink frames, and frames transmitted from access point 101 to a station 102-$i$ are referred to as downlink frames. A series of frames transmitted from a station 102-$i$ to access point 101 is referred to as an uplink traffic stream, and a series of frames transmitted from access point 101 to a station 102-$i$ is referred to as a downlink traffic stream.

Access point 101 and stations 102-1 through 102-N transmit frames over a shared-communications channel such that if two or more stations (or an access point and a station) transmit frames simultaneously, then one or more of the frames can become corrupted (resulting in a collision). As a consequent, local-area networks typically employ protocols for ensuring that a station or access point can gain exclusive access to the shared-communications channel for an interval of time in order to transmit one or more frames.

Such protocols can be classified into two types: contention-based protocols, and contention-free protocols. In a contention-based protocol, stations 102-1 through 102-N and access point 101 compete to gain exclusive access to the shared-communications channel, just as, for example, several children might fight to grab a telephone to make a call.

In a contention-free protocol, in contrast, a coordinator (e.g., access point 101, etc.) grants access to the shared-communications channel to one station at a time. An analogy for contention-free protocols is a parent (i.e., the coordinator) who grants, one at a time, each of several children a limited amount of time on the telephone to talk to grandma. One technique in which a coordinator can grant access to the shared-communications channel is polling. In protocols that employ polling, stations submit a polling request (also referred to as a reservation request) to the coordinator, and the coordinator grants stations exclusive access to the shared-communications channel sequentially in accordance with a polling schedule. This is analogous to having the children in a classroom raise their hands when they wish to talk (i.e., the polling request), and having the teacher decide on the order in which to allow each of the students to talk (i.e., the polling schedule).

A polling schedule has a temporal period (e.g., 5 seconds, etc.) and continually loops back to the beginning of the schedule after its completion. Since stations transmit only in response to a poll from the coordinator, polling-based protocols can provide contention-free access to the shared-communications channel.

SUMMARY OF THE INVENTION

The present invention enables a station that queues a frame for transmission on a periodic basis to be polled without some of the costs and disadvantages for doing so in the prior art. In particular, the illustrative embodiment polls the station in accordance with a polling schedule that is generated to reduce the delay between (i) when the station queues a frame, and (ii) when the station transmits the frame. This reduces the waiting time of the frame in the station, and is, therefore, especially advantageous for latency-sensitive applications such as voice and video telecommunications.

In accordance with the illustrative embodiment, a station that expects to periodically queue a frame for transmission sends a polling request to the polling coordinator, which request enables the polling coordinator to generate an advantageous polling schedule. To accomplish this, the polling request comprises:

(i) a temporal period (e.g., 100 milliseconds, etc.) that specifies the periodicity of when the station expects to queue a frame, and (ii) a temporal offset (e.g., 36 milliseconds, etc.) that specifies the phase (with respect to a particular reference) of when the station expects to queue the frame.

When two or more stations periodically queue a frame, it is possible that two or more stations might queue a frame at the same time. For example, when two stations have identical temporal periods and identical temporal offsets, then each frame of the first station's uplink traffic stream will be queued at the same time as each frame of the second station's uplink traffic stream. Furthermore, when two stations have different temporal periods, then some of the uplink frames of the first station will be queued at the same time as uplink frames of the second station, in accordance with the beat frequency, as is well-known in the art.

Since only one station can be polled at a time, however, the illustrative embodiment employs polling events in the polling schedule, where each polling event specifies a list of one or more stations to be polled. When uplink frames are queued simultaneously by two or more stations, the list for the associated polling event contains these stations, and the coordinator polls each station in the list in sequential order. After polling the stations, the coordinator rotates the list for the next polling event to ensure fairness in the order of polls (i.e., over time each of the stations of the polling event spends virtually the same amount of time in the first position of the list, the second position, etc.) When a station queues an uplink frame and no other station queues an uplink frame at the same time, then the list for the associated polling event contains the one station, and the polling event consists of a single poll.

In accordance with the illustrative embodiment, the coordinator also monitors downlink traffic to polled stations and determines whether the downlink traffic is periodic in nature (for example, responses to a station that transmits periodic traffic might be periodic.) If downlink traffic to the station is also periodic, then the coordinator establishes a transmission schedule for transmitting the traffic to the station as soon as possible after it is received by the coordinator. As in the case of uplink traffic, reducing the delay between the transmission and receipt of downlink frames is especially advantageous for real-time communications.

The illustrative embodiment comprises: receiving a polling request that specifies a first temporal offset and a first temporal period for a plurality of expected future transmissions; and establishing a polling schedule based on the polling request.

DETAILED DESCRIPTION

Figure 1:
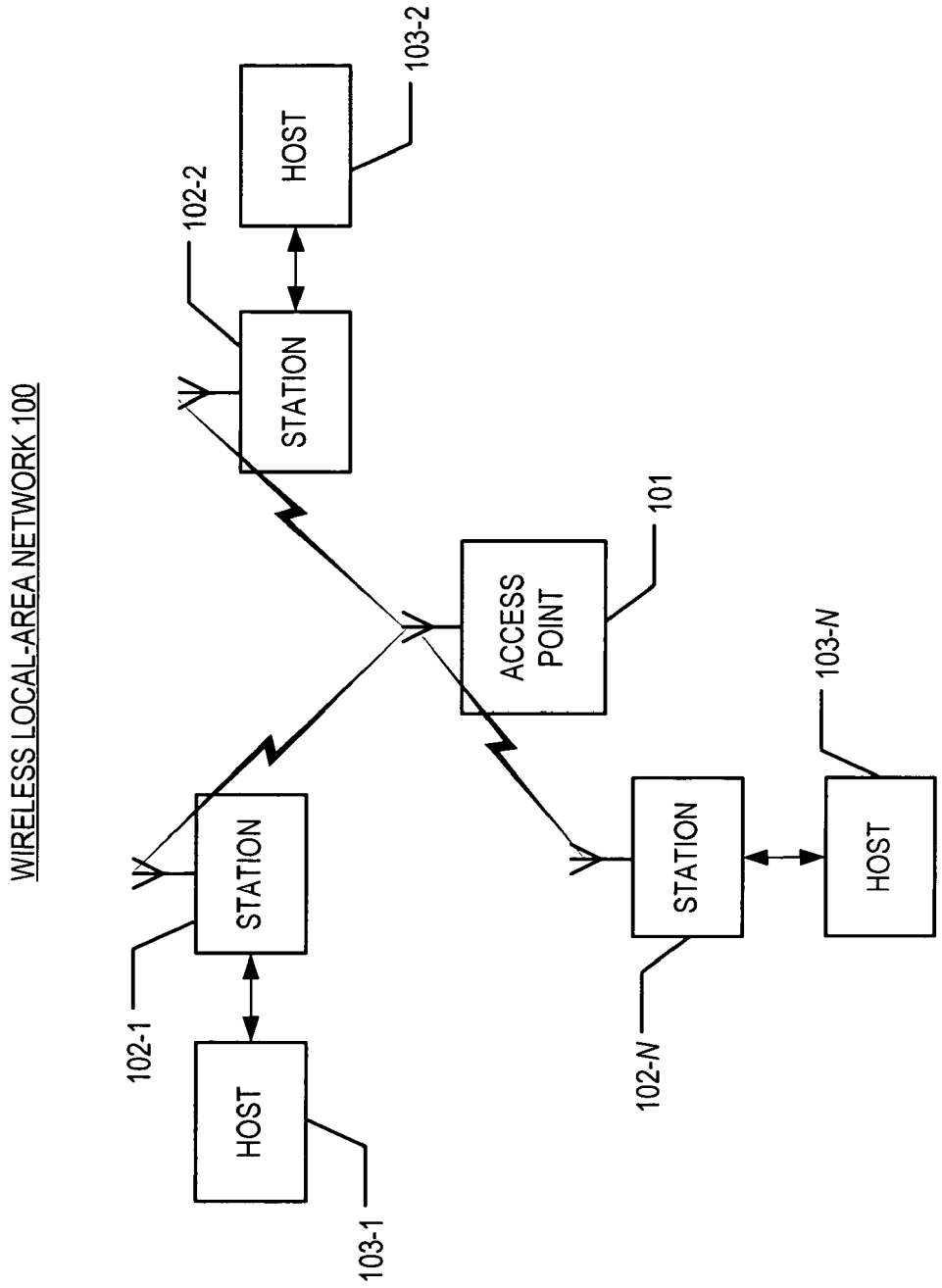
FIG. 1 depicts a schematic diagram of an exemplary wireless local-area network 100 in the prior art.
Figure 2:
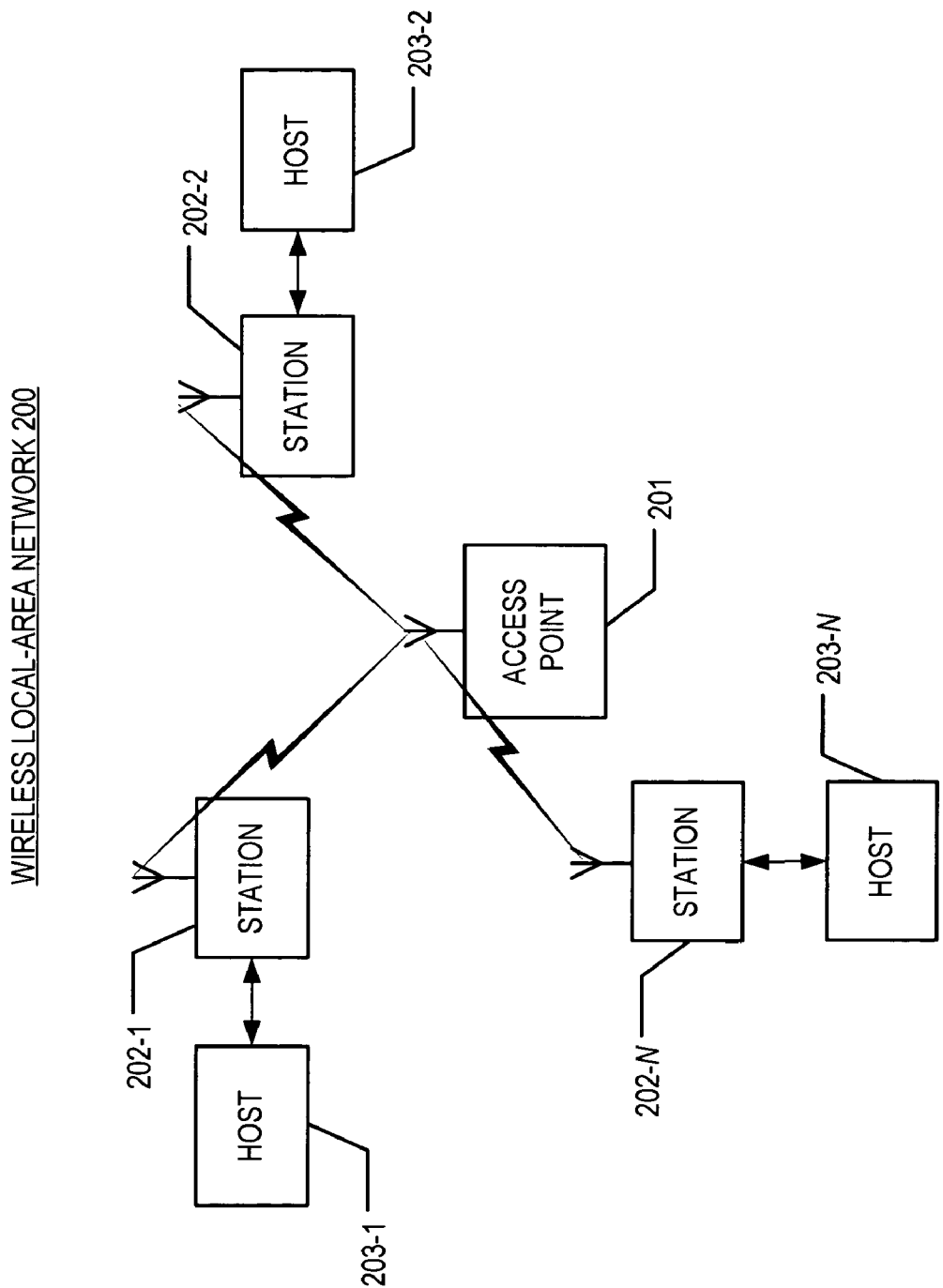
FIG. 2 depicts a schematic diagram of a portion of local-area network 200 in accordance with the illustrative embodiment of the present invention.

FIG. 2 depicts a schematic diagram of local-area network 200 in accordance with the illustrative embodiment of the present invention. Local-area network 200 comprises access point 201, stations 202-1 through 202-N, wherein i is a positive integer in the set {1, . . . N}, and hosts 203-1 through 203-N, interconnected as shown.

As shown in FIG. 2, station 202-$i$ enables host 203-$i$ to communicate wirelessly with other hosts in local-area network 200 via access point 201.

Host 203-$i$ is a device (e.g., a computer, a personal digital assistant, a printer, etc.) that is capable of generating and transmitting data to station 202-$i$. Host 203-$i$ is also capable of receiving, processing, and using the data received from station 202-$i$. It will be clear to those skilled in the art how to make and use host 203-$i$.

Station 202-$i$ is capable of receiving data from host 203-$i$ and of transmitting that data over a shared-communications channel to access point 201. Station 202-$i$ is also capable of receiving frames from the shared communications channel and of sending that data to host 203-$i$. The salient details of station 202-$i$ are described below and with respect to FIGS. 4 and 5.

Access point 201 receives frames from stations 202-1 through 202-N in accordance with a polling schedule and transmits frames to 202-1 through 202-N in accordance with a transmission schedule. The salient details of access point 201 are described below and with respect to FIGS. 3 and 6 through 9.

Figure 3:
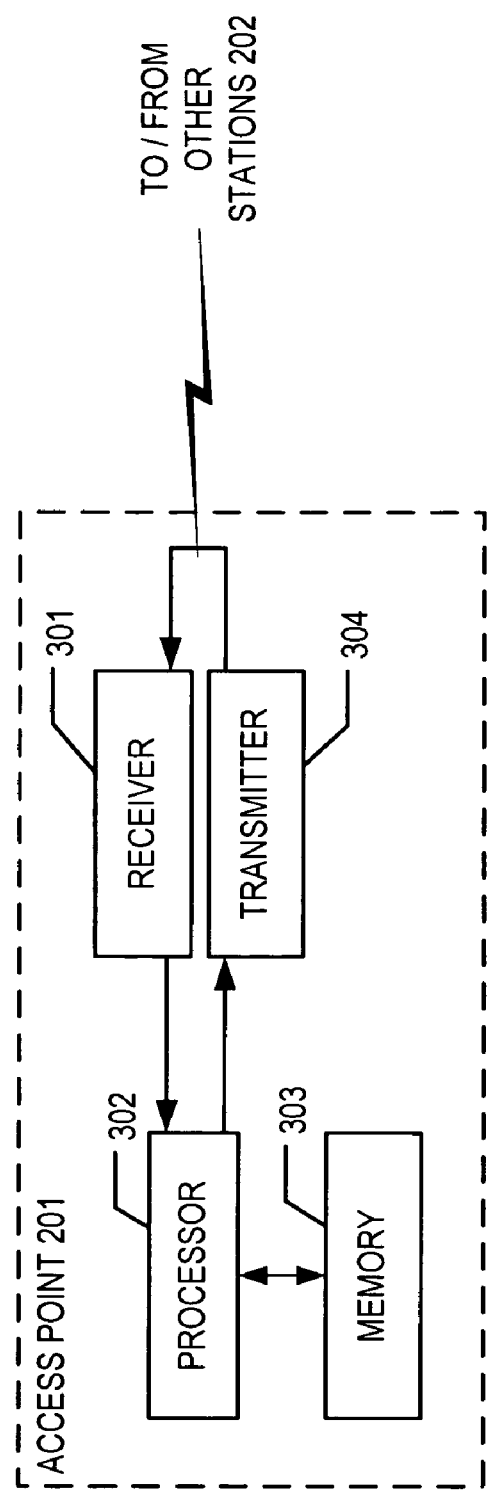
FIG. 3 depicts a block diagram of the salient components of access point 201, as shown in FIG. 2, in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving frames from shared communications channel 203, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIGS. 6 through 9. In some alternative embodiments of the present invention, processor 302 is a special-purpose processor (e.g., a network processor, etc.). In either case, it will be clear to those skilled in the art, after reading this disclosure, how to make and use processor 302.

Memory 303 is capable of storing programs and data used by processor 302, as is well-known in the art, and might be any combination of random-access memory (RAM), flash memory, disk drive, etc. It will be clear to those skilled in the art, after reading this specification, how to make and use memory 303.

Transmitter 304 is a circuit that is capable of receiving frames from processor 302, in well-known fashion, and of transmitting them on shared communications channel 203. It will be clear to those skilled in the art how to make and use transmitter 304.

Figure 4:
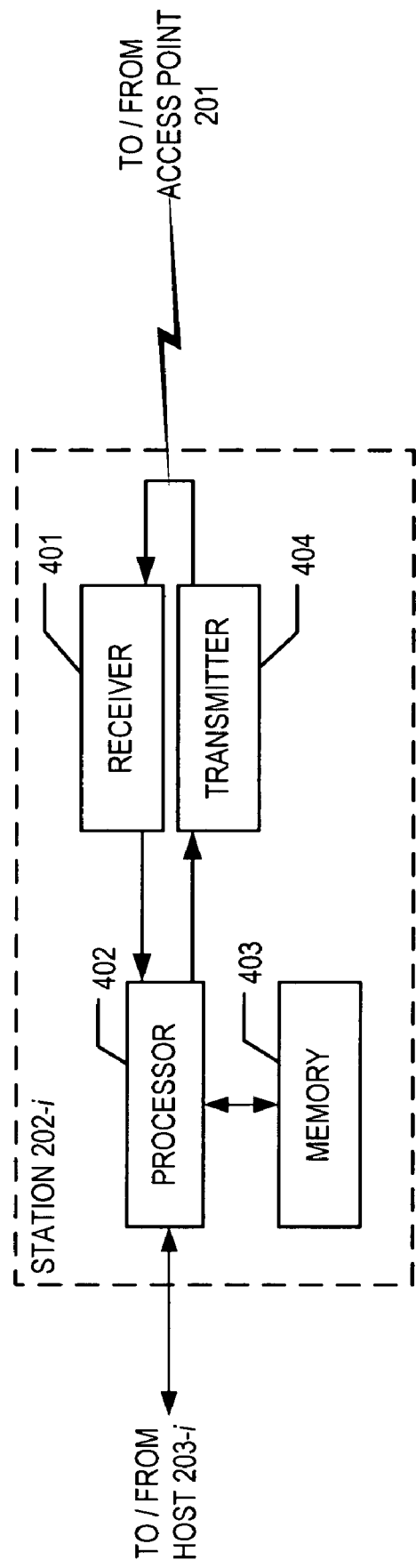
FIG. 4 depicts a block diagram of the salient components of station 202-$i$, as shown in FIG. 2, in accordance with the illustrative embodiment of the present invention.

FIG. 4 depicts a block diagram of the salient components of station 202-$i$, in accordance with the illustrative embodiment of the present invention. Station 202-$i$ comprises receiver 401, processor 402, memory 403, and transmitter 404, interconnected as shown.

Receiver 401 is a circuit that is capable of receiving frames from shared communications channel 203, in well-known fashion, and of forwarding them to processor 402. It will be clear to those skilled in the art how to make and use receiver 401.

Processor 402 is a general-purpose processor that is capable of executing instructions stored in memory 403, of reading data from and writing data into memory 403, and of executing the tasks described below and with respect to FIG. 6. In some alternative embodiments of the present invention, processor 402 is a special-purpose processor (e.g., a network processor, etc.). In either case, it will be clear to those skilled in the art, after reading this disclosure, how to make and use processor 402.

Memory 403 is capable of storing programs and data used by processor 402, as is well-known in the art, and might be any combination of random-access memory (RAM), flash memory, disk drive, etc. It will be clear to those skilled in the art, after reading this specification, how to make and use memory 403.

Transmitter 404 is a circuit that is capable of receiving frames from processor 402, in well-known fashion, and of transmitting them on shared communications channel 203. It will be clear to those skilled in the art how to make and use transmitter 404.

In the illustrative embodiment of the present invention, access point 201 and stations 202-1 through 202-N support at least one IEEE 802.11 protocol. In alternative embodiments of the present invention, access point 201 and stations 202-1 through 202-N might support other protocols in lieu of, or in addition to, one or more IEEE 802.11 protocols. Furthermore, in some embodiments of the present invention local-area network 200 might comprise an alternative shared-communications channel (for example, wireline instead of wireless). In all such cases, it will be clear to those skilled in the art after reading this specification how to make and use access point 201 and stations 202-1 through 202-N.

Figure 5:
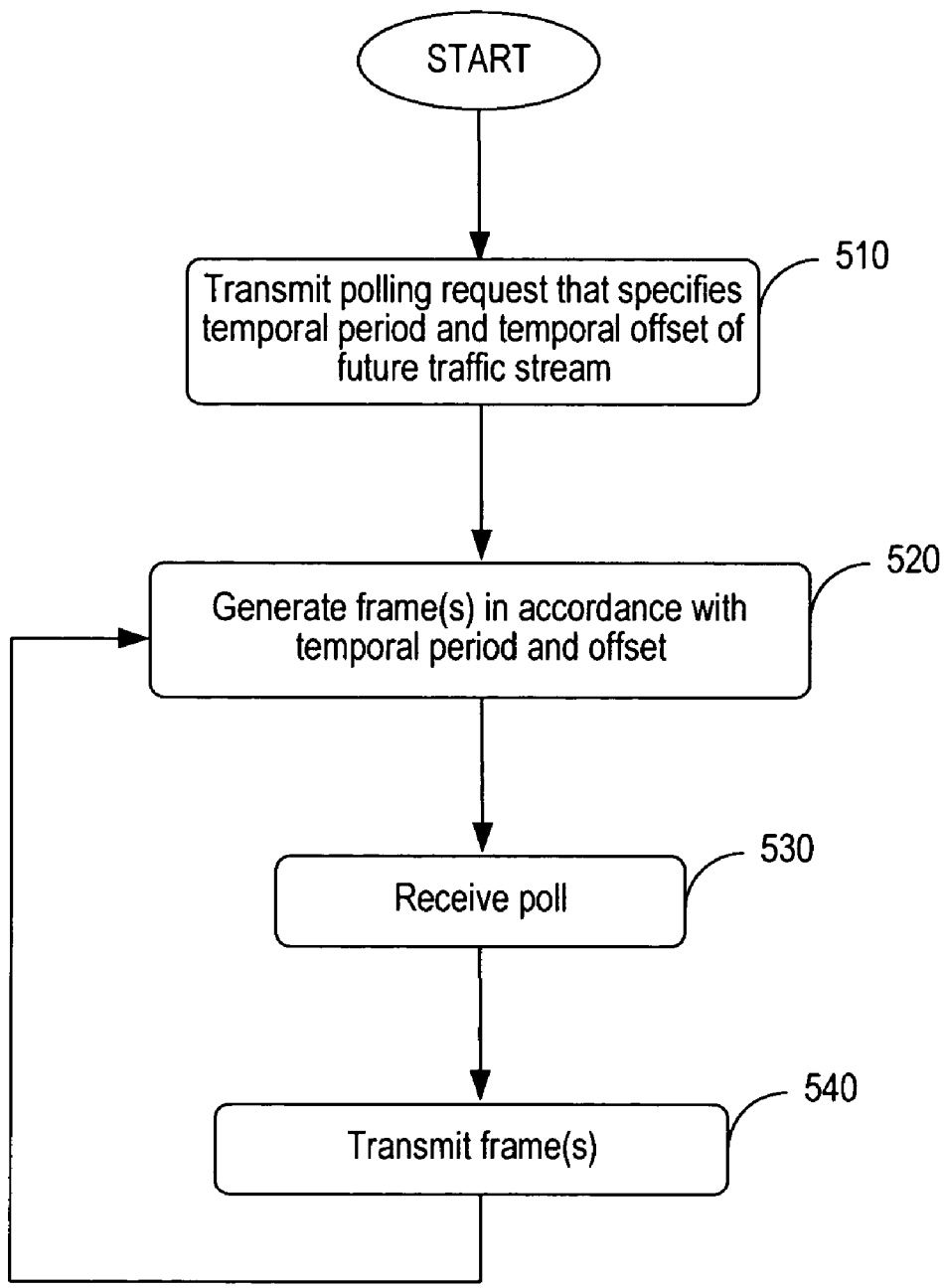
FIG. 5 depicts an event loop of the salient tasks performed by a station 202-$i$ that transmits periodic traffic, in accordance with the illustrative embodiment of the present invention.

FIG. 5 depicts an event loop of the salient tasks performed by a station 202-$i$ which transmits periodic traffic, for i=1 to N, in accordance with the illustrative embodiment of the present invention.

At task 510, station 202-$i$ transmits a polling request that specifies (i) the temporal period of expected future transmissions (e.g., 100 milliseconds, 3 seconds, etc.), and (ii) a temporal offset with respect to a particular reference (e.g., access point 201's IEEE 802.11 beacon, etc.) The polling request thus informs access point 201 of the period of station 202-$i$'s future traffic stream, and the phase of the traffic stream with respect to the reference.

As is well-known in the art, in local-area networks that operate in accordance with IEEE 802.11e (a version of 802.11 that supports quality-of-service (QoS)), station 202-$i$ transmits a polling request to access point 201 in combination with a traffic specification (TSPEC) that characterizes, via a plurality of fields, traffic generated by station 202-$i$. In some embodiments of the present invention, an IEEE 802.11e-compliant station 202-$i$ might encode one or both of the temporal period and temporal offset in the traffic specification via one or more TSPEC fields. In one such encoding, station 202-$i$ populates both the TSPEC Minimum Service Interval and Maximum Service Interval fields with the temporal period. In accordance with this encoding, access point 201, upon receipt of a polling request in which the associated traffic specification has a Minimum Service Interval field and a Maximum Service Interval field with the same value, recognizes that station 202-$i$ generates periodic traffic with a temporal period equal to this value. (A method by which access point 201 ascertains the temporal offset when a polling request specifies only the temporal period is disclosed in co-pending U.S. patent application "Exploratory Polling For Periodic Traffic Sources,".)

In another exemplary encoding, station 202-$i$ populates the Maximum Service Interval field with the temporal period, and the Minimum Service Interval field with the sum of the temporal period and the temporal offset. In accordance with this encoding, access point 201, upon receipt of a polling request in which the associated traffic specification has a Minimum Service Interval field value that is greater than the Maximum Service Interval field value, deduces that station 202-$i$ generates periodic traffic with a temporal period equal to the Maximum Service Interval field value, and a temporal offset equal to the difference between the Minimum Service Interval and Maximum Service Interval field values.

As will be appreciated by those skilled in the art, at task 510 station 202-$i$ can encode one or both of the temporal period and temporal offset as arbitrary functions of one or more traffic specification fields, and at task 610, described below, access point 201 can retrieve the temporal period and temporal offset from the traffic specification via the appropriate decoding logic.

At task 520, station 202-$i$ queues, in well-known fashion, one or more frames in accordance with the temporal period and temporal offset specified at task 510.

At task 530, station 202-$i$ receives a poll from access point 201 in well-known fashion.

At task 540, station 202-$i$ transmits the frame(s) queued at task 520 in accordance with the appropriate protocol (e.g., an IEEE 802.11 protocol, etc.). After task 540 has been completed, execution continues back at task 520.

Figure 6:
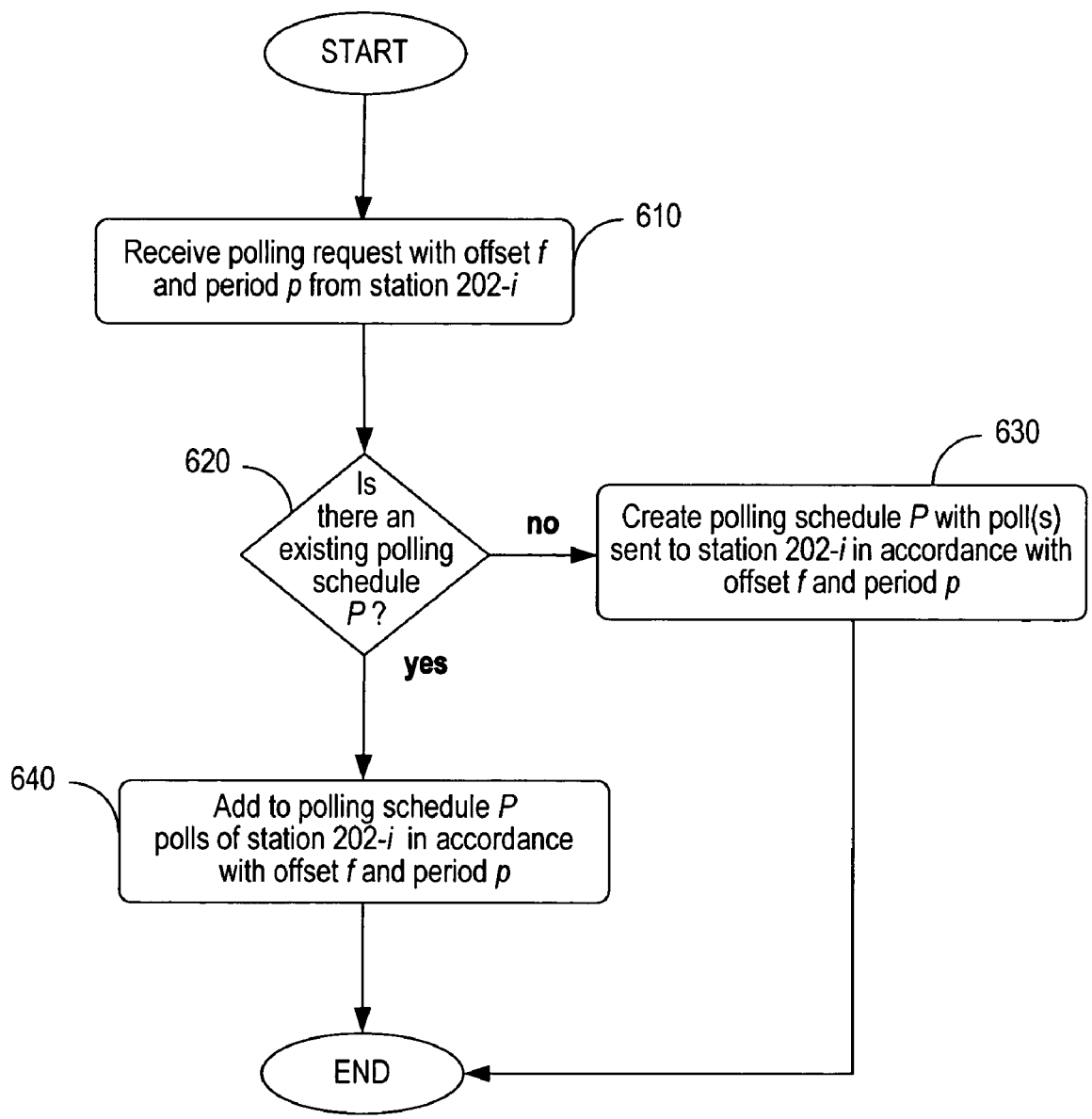
FIG. 6 depicts a flowchart of the salient tasks performed by access point 201 in establishing a polling schedule, in accordance with the illustrative embodiment of the present invention.

FIG. 6 depicts a flowchart of the salient tasks performed by access point 201 in establishing a polling schedule, in accordance with the illustrative embodiment of the present invention.

At task 610, access point 201 receives a polling request from station 202-$i$ that specifies a temporal offset $\phi$ and period $\pi$, where i is a positive integer less than or equal to N. As described above, access point 201 might obtain $\phi$ and $\pi$ from a traffic specification associated with the polling request.

At task 620, access point 201 checks whether a polling schedule P already exists. (P is a schedule for polls to all stations in local-area network 200; i.e., P can be thought of as the union of a plurality of polling schedules $\{P_1, P_2, \ldots, P_N\}$, where $P_i$ is one polling schedule for station 202-$i$. If polling schedule P already exists, execution proceeds to task 640, otherwise execution proceeds to task 630.

At task 630, access point 201 creates a new polling schedule P with one or more polls sent to station 202-$i$ in accordance with temporal offset $\phi$ and period $\pi$. Polling schedule P repeats continually, and thus in some embodiments it is particularly convenient to set the duration of schedule P to a value divisible by period $\pi$. After completion of task 630, execution of the method of FIG. 6 terminates.

At task 640, access point 201 adds one or more polls of station 202-$i$ to polling schedule P in accordance with temporal offset $\phi$ and period $\pi$. In accordance with the illustrative embodiment, task 640 comprises, if necessary, adjusting the temporal period of schedule P accordingly. For example, if a poll that occurs every 6 seconds is to be added to a polling schedule that has a temporal period of 4, then the new polling schedule should have a temporal period of 12, comprising (i) three successive instances of the previous polling schedule, and (ii) two instances of the added poll.

Formally, if polling schedule P previously included polls to a set of stations S and previously had a temporal period Q, then the temporal period of the new polling schedule P should be increased, if necessary, to a value Q' such that for all stations 202-$n$ ∈ S, Q' is divisible by $\pi_n$, where $\pi_n$ is the temporal period of station 202-$n$. (In other words, Q' is the least common multiple of the temporal periods of every station in polling schedule P.)

As another example, when:
the previous polling schedule P has
(i) a temporal period of 6.0 seconds, and
(ii) a single poll to station 202-$j$ at time 5.0 (i.e., $\pi_y$=6.0 and $\phi_y$=5.0), wherein j is a positive integer such that j≦N and j≠i; and
station 202-$i$, which has temporal period $\pi_i$=4.0 and offset $\phi_i$=2.0, is added to polling schedule P; then
the new polling schedule will have
(i) a temporal period of 12.0 seconds,
(ii) polls to station 202-$j$ at times 5.0 and 11.0, and
(iii) polls of station 202-$i$ at times 2.0, 6.0, and 10.0.

As will be appreciated by those skilled in the art, the above method of constructing a polling schedule might result in simultaneous polls of two or more stations. As described above, since only one station can be polled at a time, the illustrative embodiment employs polling events in the polling schedule, where each polling event specifies a list of one or more stations to be polled. A description of how the illustrative embodiment processes the lists associated with polling events is disclosed below and with respect to FIG. 7 and FIG. 8.

After completion of task 640, execution of the method of FIG. 6 terminates.

Figure 7:
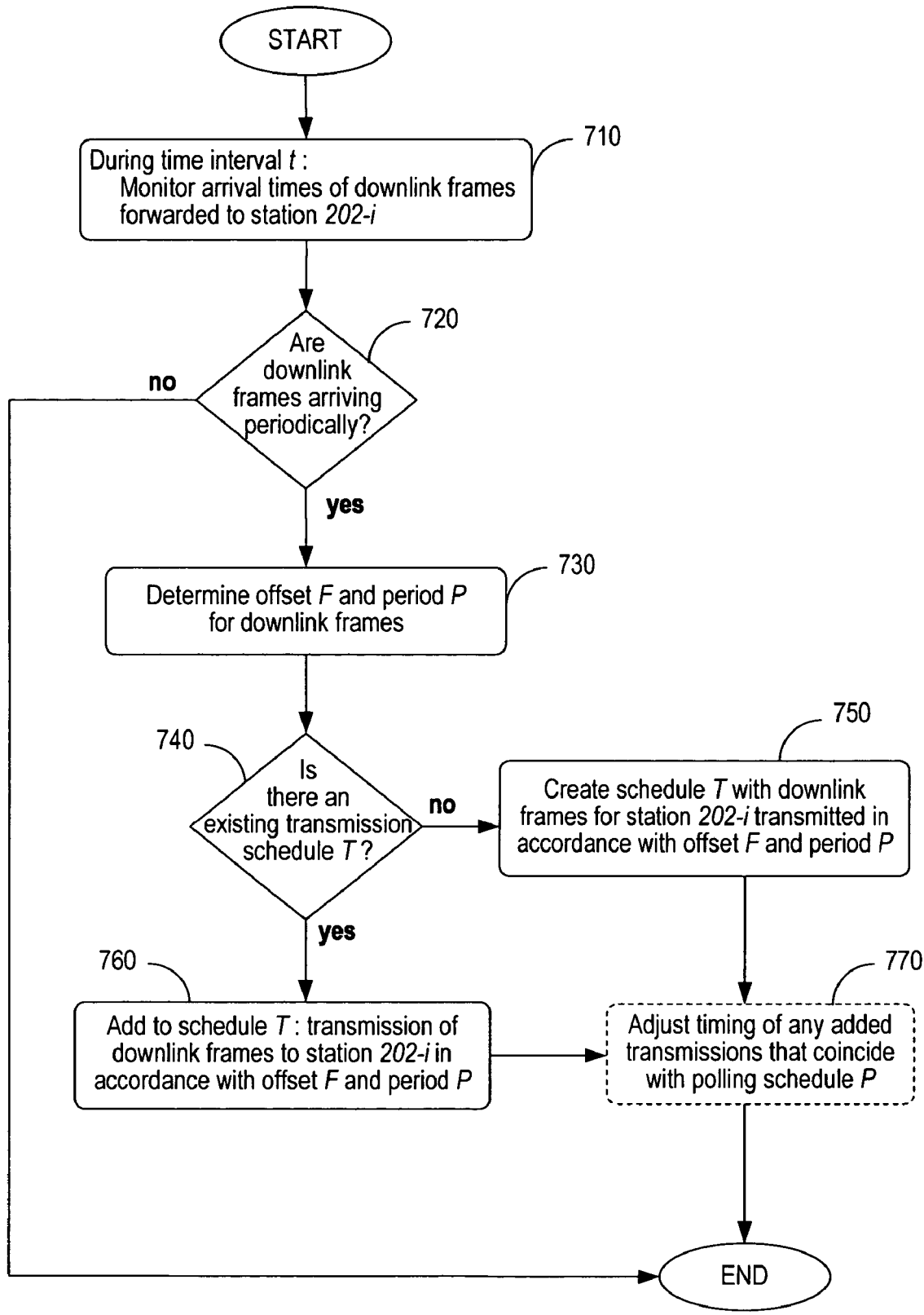
FIG. 7 depicts a flowchart of the salient tasks performed by access point 201 in establishing a downlink transmission schedule, in accordance with the illustrative embodiment of the present invention.

FIG. 7 depicts a flowchart of the salient tasks performed by access point 201 in establishing a transmission schedule, in accordance with the illustrative embodiment of the present invention. The transmission schedule specifies when access point 201 transmits buffered downlink traffic to stations 202-$i$ in wireless local-area network 200, for i=1 to N.

At task 710, access point 201 monitors the arrival times of downlink frames received by access point 201 and transmitted from access point 201 to station 202-$i$. The monitoring of task 710 occurs during a time interval $\tau$ that is sufficiently long to serve as an "observation period" for characterizing downlink traffic to station 202-$i$ (i.e., $\tau$ is sufficiently long to be statistically significant). It will be clear to those skilled in the art how to choose a suitable value for $\tau$.

At task 720, access point 201 determines, in well-known fashion, whether downlink frames for station 202-$i$ arrive in accordance with a regular temporal period, based on the observation period of task 710. This can be accomplished, for example, by performing a Fourier analysis of the arrival times of the downlink frames. If the determination is affirmative, execution proceeds to task 730, otherwise, the method of FIG. 7 terminates.

At task 730, access point 201 determines the temporal period $\Pi$ and temporal offset $\Phi$ of downlink frames for station 202-$i$, where offset $\Phi$ is relative to the 802.11 beacon transmitted by access point 201. It is well-known in the art how to determine the period and offset (i.e., "phase") of a periodic traffic stream. For example, this too can be accomplished by performing a Fourier analysis of the arrival times of the downlink frames.

At task 740, access point 201 checks whether a transmission schedule T already exists. If none exists, execution proceeds to task 750, otherwise execution continues at task 760.

At task 750, a new transmission schedule T is created with downlink frames for station 202-$s$ transmitted in accordance with temporal offset $\Phi$ and temporal period $\Pi$.

At task 760, the existing transmission schedule T is augmented with the transmission of downlink frames to station 202-$i$ in accordance with temporal offset $\Phi$ and temporal period $\Pi$. As will be appreciated by those skilled in the art, it is possible that a downlink transmission to station 202-$i$ occurs at the same time as another downlink transmission already in schedule T. Consequently, the illustrative embodiment maintains a list of one or more stations at each "transmission event" that indicates to which station(s) downlink frames should be transmitted. As is the case for polling schedule P, downlink frames are transmitted sequentially to the stations in the list, beginning at the time specified in transmission schedule T. The illustrative embodiment employs a mechanism disclosed below in the description of FIG. 9 for ensuring "fairness" with respect to the order in which downlink frames are transmitted to stations in a list.

At task 770, any collisions between the new transmission schedule T and polling schedule P (i.e., a transmission in schedule T and a poll in schedule P that occur simultaneously) are overcome by suitably adjusting (i.e., via a slight time shift) the appropriate newly-added transmission of schedule T. In some embodiments of the present invention, one or more tasks or methods might be performed in lieu of task 770 for avoiding collisions between schedules P and T. (For example, the illustrative embodiment employs (i) the method of FIG. 8, disclosed below, for combining polling schedule P and transmission schedule T into a composite schedule, and (ii) the event loop mechanism of FIG. 9, disclosed below, for rotating between simultaneous polls and transmissions in round-robin fashion, in lieu of task 770.

Figure 8:
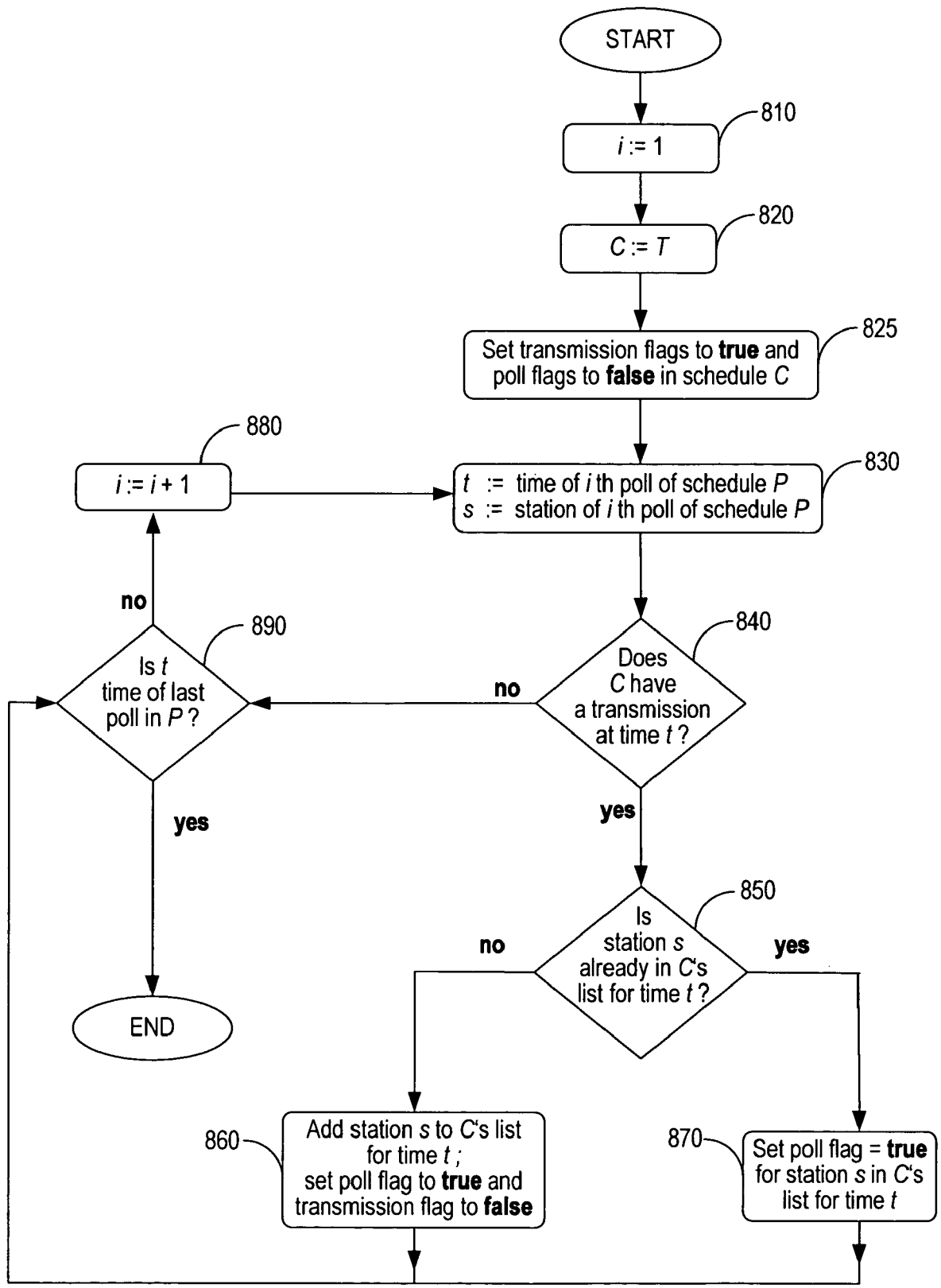
FIG. 8 depicts a flowchart of the salient tasks performed by access point 201 in combining a polling schedule and a transmission schedule into a composite schedule, in accordance with the illustrative embodiment of the present invention.

FIG. 8 depicts a flowchart of the salient tasks performed by access point 201 in combining a polling schedule and a transmission schedule into a composite schedule, in accordance with the illustrative embodiment of the present invention.

At task 810, index variable i is initialized to 1.

At task 820, variable C, which is used to store the composite schedule, is initialized to transmission schedule T.

At task 825, for each combination of station and time in composite schedule C, an associated transmission flag is set to true, and an associated poll flag is set to false. In the illustrative embodiment, the transmission and poll flags are stored in composite schedule C; however, it will be clear to those skilled in the art that in some other embodiments these flags might be stored in a separate data structure.

At task 830, variable t is set to the time of the $i^{th}$ poll of polling schedule P, and variable s is set to the station polled in the $i^{th}$ poll of polling schedule P.

At task 840, access point 201 checks whether composite schedule C has a transmission at time t (obtained from transmission schedule T at task 820). If so, execution proceeds to task 850, otherwise execution continues at task 880.

At task 850, access point 201 checks whether station s is already in the list of stations at time t in composite schedule C. If so, execution proceeds to task 870, otherwise, execution proceeds to task 860.

At task 860, station s is added to the list of stations at time t in composite schedule C. The associated poll flag for station s at time t is set to true, and the associated transmission flag is set to false. After the completion of task 860, execution continues at task 880.

At task 870, the associated poll flag for station s at time t is set to true. After the completion of task 870, execution continues at task 880.

At task 880, access point 201 checks whether the poll at time t is the last poll in polling schedule P. If so, execution continues at task 890, otherwise the method of FIG. 8 terminates.

At task 890, index variable i is incremented by 1. After the completion of task 890, execution continues back at task 830.

Figure 9:
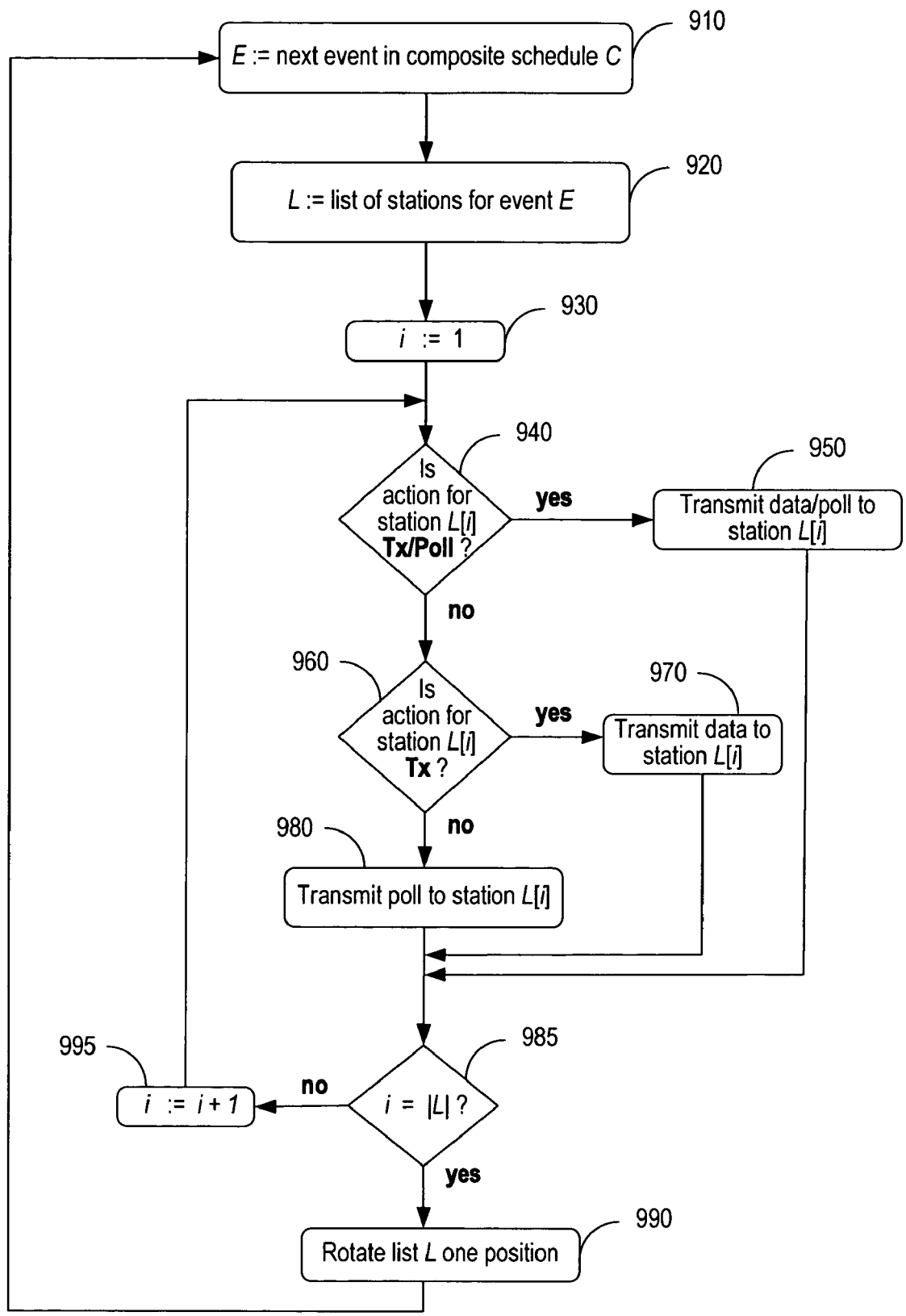
FIG. 9 depicts an event loop for access point 201 for processing a composite schedule, in accordance with the illustrative embodiment of the present invention.

FIG. 9 depicts an infinite event loop for access point 201 for processing composite schedule C, in accordance with the illustrative embodiment of the present invention. When the event loop is first started, execution begins at task 910.

At task 910, variable E is set to the next event in composite schedule C. If the event loop has just been started, the next event is the first event of schedule C.

At task 920, variable L is set to the list of stations associated with event E.

At task 930, index variable i is initialized to 1.

At task 940, access point 201 checks whether the transmission and poll flags for the $i^{th}$ station in list L (i.e., L[i]) are both true, indicating that a combined transmission/poll is the appropriate action. If so, execution proceeds to task 950, otherwise execution continues at task 960.

At task 950, access point 201 transmits a downlink frame with a "piggybacked" poll to station L[i] in well-known fashion. After the completion of task 950, execution proceeds to task 985.

At task 960, access point 201 checks whether the transmission and poll flags for L[i] are true and false, respectively, indicating that a downlink transmission is the appropriate action. If so, execution proceeds to task 970, otherwise execution continues at task 980.

At task 970, access point 201 transmits a downlink frame to station L[i] in well-known fashion. After the completion of task 970, execution proceeds to task 985.

At task 980, access point 201 transmits a poll to station L[i] in well-known fashion. After the completion of task 980, execution proceeds to task 985.

At task 985, access point 201 checks whether variable i is equal to the size of list L, indicating that all stations in the list have been processed in accordance with tasks 940 through 980. If so, execution proceeds to task 990, otherwise execution proceeds to task 995.

At task 990, list L is rotated one position so that the first station in the list becomes the last, the second station in the list becomes the first, the third station becomes the second, etc. This establishes a new order for list L in preparation for processing event E in the next iteration of schedule C. After the completion of task 990, execution continues back at task 910 for the next invocation of the event loop.

At task 995, index variable i is incremented by 1. After the completion of task 995, execution continues back at task 940 for processing the next station in list L.

Although the illustrative embodiment of the present invention is disclosed in the context of IEEE 802.11 local-area networks, it will be clear to those skilled in the art after reading this specification how to make and use embodiments of the present invention for other kinds of networks and network protocols.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method performed by an Access Point comprising:
   receiving a polling request that specifies a first temporal period and a first temporal offset for a plurality of expected future transmissions from a first station;
   establishing a polling schedule based on said polling request;
   receiving a plurality of frames for forwarding to said first station;
   determining whether the arrival times of said frames are substantially periodic as described by a second temporal period and a second temporal offset; and
   establishing, when the arrival times of said frames are substantially periodic, a transmission schedule for transmitting each of said frames to said first station;
   wherein said transmission schedule is based on said second temporal period and said second temporal offset;
   wherein said transmission schedule is also based on said polling schedule; and
   transmitting each of said frames to said first station in accordance with said transmission schedule, wherein said transmitting and said receiving said plurality of frames are via a shared-communications channel.

2. The method of claim 1 further comprising transmitting a poll to said first station in accordance with said polling schedule, wherein the transmission of said poll and the reception of said polling request are via a shared-communications channel.

3. The method of claim 2 wherein the transmission of said poll and the reception of said polling request are in accordance with a wireless local area network protocol.

4. The method of claim 1 further comprising combining said polling schedule and said transmission schedule into a composite schedule.

5. An apparatus comprising:
   a receiver for receiving a polling request that specifies a first temporal period and a first temporal offset for a plurality of expected future transmissions from a first station;
   a processor for establishing a polling schedule based on said polling request;
   wherein said receiver is also for receiving a plurality of frames for forwarding to said first station; and
   wherein said processor is also for:
   (i) determining whether the arrival times of said frames are substantially periodic as described by a second temporal period and a second temporal offset;
   (ii) establishing, when the arrival times of said frames are substantially periodic, a transmission schedule for transmitting each of said frames to said first station, wherein said transmission schedule is based on said second temporal offset and said second temporal period; and
   wherein said processor is also for combining said polling schedule and said transmission schedule into a composite schedule.

6. The apparatus of claim 5 further comprising a transmitter for transmitting a poll to said first station in accordance with said polling schedule.

7. The apparatus of claim 6 wherein said transmitter and said receiver operate in accordance with a wireless local area network protocol.

8. The apparatus of claim 5 further comprising a transmitter for transmitting:
   i. said poll to said first station in accordance with said polling schedule; and
   ii. each of said frames to said first station in accordance with said transmission schedule.

9. The apparatus of claim 8 wherein said transmitter and said receiver operate in accordance with a wireless local area network protocol.

10. An apparatus comprising:
a transmitter for transmitting a polling request that specifies a temporal period and a temporal offset for a plurality of expected future transmissions;
a receiver for receiving a poll in response to said polling request; and
a processor for queuing a frame in accordance with said temporal period and on said temporal offset;
wherein said receiver is also for receiving a plurality of frames for forwarding to said first station; and
wherein said processor is also for:
  (i) determining whether the arrival times of said frames are substantially periodic as described by a second temporal period and a second temporal offset;
  (ii) establishing, when the arrival times of said frames are substantially periodic, a transmission schedule for transmitting each of said frames to said first station, wherein said transmission schedule is based on said second temporal offset and said second temporal period; and
wherein said processor is also for combining said polling schedule and said transmission schedule into a composite schedule.

11. The apparatus of claim 10 wherein said transmitter is also for transmitting said frame in response to said poll, and wherein said transmitter and said receiver operate in accordance with a wireless local area network protocol.

12. The apparatus of claim 10 wherein the transmitting of said polling request, the transmitting of said frame, and the reception of said poll are via a shared-communications channel.

* * * * *